(No Model.)

S. R. JARVIS.
HARNESS HOOK.

No. 274,782. Patented Mar. 27, 1883.

Witnesses:
Phil C. Dietrich.
W. R. Keyworth.

Inventor:
Solomon R. Jarvis
by
J. A. Alexander
Attorney.

UNITED STATES PATENT OFFICE.

SOLOMON R. JARVIS, OF PHILIPPI, WEST VIRGINIA.

HARNESS-HOOK.

SPECIFICATION forming part of Letters Patent No. 274,782, dated March 27, 1883.

Application filed February 2, 1883. (No model.)

*To all whom it may concern:*

Be it known that I, S. R. JARVIS, of Philippi, in the county of Barbour and State of West Virginia, have invented certain new and useful Improvements in Harness-Hooks; and I do hereby declare that the following is a full, clear, and exact description thereof, reference being had to the accompanying drawings, and to the letters of reference marked thereon, which form part of this specification, in which—

Figure 1:
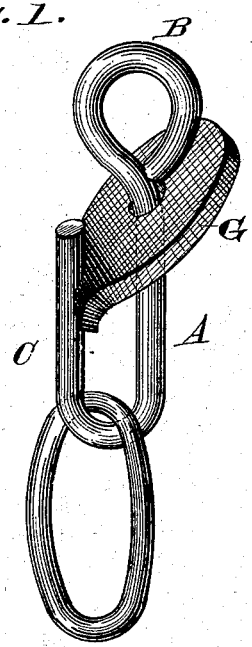
Figure 2:
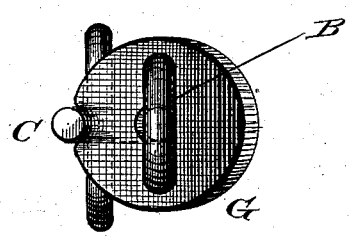
Figure 3:
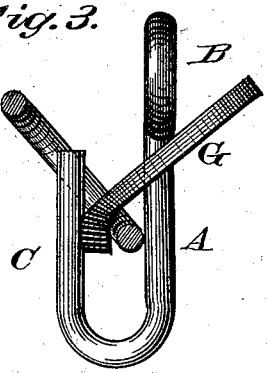
Figure 4:
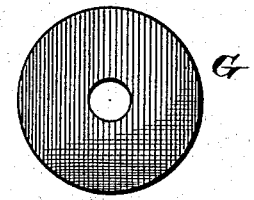

Figure 1 is a perspective view of a hame-hook to which my improvement is applied, also showing a ring of a trace attached to the said hook. Fig. 2 is a top view of a hook having my improved removable rotary elastic cushion applied to it. Fig. 3 is a view showing the cushion compressed against the prong of the hook for the purpose of illustrating the impossibility of a casual detachment of the ring. Fig. 4 is a view of the removable perforated disk which I apply to a hook to prevent the detachment of a ring therefrom.

My invention consists in an elastic centrally-perforated flexible disk, in combination with a hook having two parallel arms and an eye on its shank. My object is to obviate the steel spring-tongues which have heretofore been applied to snap-hooks, and which in practice are objectionable.

The nature of my invention consists in a hook which may be made of wrought or steel wire, and which has an eye formed on its shank. The shank and the tang of the hook are parallel, and are combined with a disk of a flexible material, which is simply slipped on the hook, and which affords a stopping attachment for the ring, as will be fully understood from the following description, when taken in connection with the annexed drawings.

Before describing my improvement I will state that a harness-hook has been patented in which a wheel having an elastic periphery has been pivoted to the shank of the hook. It is obvious that the coupling-ring can be disconnected from the hook in this case with the same facility that it was introduced into the hook.

For a hame-hook or for any hook wherein it is desired to prevent a detachment of a trace, a chain, or a ring, I construct the hook with a shank, A, on one end of which is formed an eye, B. The other end of the shank A is bent so that the hooking portion C is parallel to the shank A. This hook which I have above described, and which is represented in the drawings hereto annexed, is the well-known hame-hook. My improved perforated disk G is applied to this hook by simply slipping it over the end of the hook and adjusting it between the long end of the hooking portion and the shank of the hook proper. This disk G is made of india-rubber, thick compressed leather, or of any other flexible material which will slip freely on the shank of the hook, and which will allow any portion of it to be flexed for the purpose of detaching a ring from the hook.

Now, from what I have above said, it will be seen that I employ a simple hook of the form substantially as shown and described, and a flexible or self-binding disk which is allowed to rotate freely about the shank of the hook, and thus to present new fibers to be compressed when there is a backward strain brought to bear against the disk. It will also be observed that the disk will automatically present a resistance in proportion to the tendency of the connected parts to become disengaged.

Having thus fully described my invention, what I claim as new, and desire to secure by Letters Patent, is—

The improved article of manufacture consisting of the harness-hook formed substantially as described, and having a flexible disk applied to the shank of the hook, at right-angles thereto, the radius of said disk being greater than the distance between the shank and prong, and adapted to close the opening between the shank and point of the hook, all substantially as described.

In testimony that I claim the foregoing as my own I affix my signature in presence of two witnesses.

SOLOMON R. JARVIS.

Witnesses:
G. W. GALL, Jr.,
WILL F. BYRER.